US012410893B1

(12) United States Patent
Hwang

(10) Patent No.: US 12,410,893 B1
(45) Date of Patent: Sep. 9, 2025

(54) CANDLE LIGHT WITH MODULAR DESIGN FOR EASY TRANSPORTATION

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 19/033,753

(22) Filed: Jan. 22, 2025

(51) Int. Cl.
*F21S 2/00* (2016.01)
*F21S 9/02* (2006.01)
*F21S 10/04* (2006.01)
*F21Y 115/10* (2016.01)

(52) U.S. Cl.
CPC ................ *F21S 2/005* (2013.01); *F21S 9/02* (2013.01); *F21S 10/04* (2013.01); *F21Y 2115/10* (2016.08)

(58) Field of Classification Search
CPC ........... F21S 10/04; F21S 10/046; F21S 6/001
See application file for complete search history.

(56) References Cited

U.S. PATENT DOCUMENTS

| | | | | |
|---|---|---|---|---|
| 5,921,767 | A * | 7/1999 | Song | F23D 3/16<br>431/253 |
| 2018/0003352 | A1* | 1/2018 | Cao | F21V 23/02 |
| 2020/0217469 | A1* | 7/2020 | Fan | F21S 10/046 |
| 2025/0093003 | A1* | 3/2025 | Jiang | F21V 23/0485 |

* cited by examiner

*Primary Examiner* — Eric T Eide
(74) *Attorney, Agent, or Firm* — BACON & THOMAS, PLLC

(57) ABSTRACT

A candle light with a modular design for easy transportation includes a first light module, and a second light module in a shape substantially the same as the first light module, and each light module includes a base, a support tube, a simulated flame lighting module, and a sleeve. During storage, the first light module can be placed into the sleeve of the second light module as a whole, so that the light modules of different sizes that originally needed to be packaged separately can be packaged together to reduce volume and transportation costs.

10 Claims, 10 Drawing Sheets

CANDLE LIGHT WITH MODULAR DESIGN FOR EASY TRANSPORTATION

FIELD OF THE INVENTION

The present invention relates to an electronic candle light, and more particularly to an electronic light with a modular design of components for packaging at least two electronic candle lights of different sizes together to reduce volume and packaging and transportation costs.

BACKGROUND OF THE INVENTION

In general, the structure of related-art electronic candle lights has a through hole on the top of a candle-shaped casing, the casing is provided with a simulated flame sheet above the through hole, and an LED, an electronic drive device and a power supply module inside the casing. The electronic drive device drives the simulated flame sheet to flicker to the left and to the right above the through hole. When the light from the LED is projected onto the simulated flame sheet through the through hole, the simulated flame sheet can simulate the visual effect of a flickering candle.

In practice, based on the scale and location of the place of use, consumers have different needs for different sized electronic candle light. For example, a smaller sized electronic candle light can be used in indoor space to create atmosphere, and a larger sized electronic candle light can be used in outdoor space to lay out the environment. However, the electronic candle lights with the above structural design are packaged one by one for the purposes of transportation and sale, thereby making the packaging and transportation costs of the electronic candle light remain high.

In view of this problem, the present inventor envisioned that if at least two electronic candle lights of different sizes could be packaged with a modular design, it would not only provide consumers with a wide variety of choices of sizes and convenience, but also overcome the aforementioned problem of separate packaging that incurs a larger transportation volume and a higher transportation cost.

SUMMARY OF THE INVENTION

The purpose of the present invention is to provide a modular design to facilitate the packaging and transportation of candle lights.

To achieve the forementioned purpose, the present invention discloses a candle light including a first light module, and a second light module in a shape substantially the same as the first light module.

The first light module includes a first base provided with a battery, a first support tube, a first simulated flame lighting module electrically connected to the battery, and a first sleeve having an inner periphery, an outer periphery, a top, and a bottom. The first sleeve has a first installation space defined between its top, bottom and inner periphery for installing the first base, the first support tube and the first simulated flame lighting module. The first base is assembled with the bottom, the first simulated flame lighting module is assembled with the top, and the first support tube is assembled between the first simulated flame lighting module and the first base.

The second light module includes a second base provided with a battery, a second support tube, a second simulated flame lighting module electrically connected to the battery, and a second sleeve having an inner periphery, an outer periphery, a top, and an open bottom. The inner periphery of the second sleeve is greater than the outer periphery of the first sleeve, and the second sleeve has a second installation space defined between its top, bottom and inner periphery for installing the second base, the second support tube and the second simulated flame lighting module. The second base is detachably assembled with the bottom, the second simulated flame lighting module is detachably assembled with the top, and the second support tube is detachably assembled between the second simulated flame lighting module and the second base.

The first base of first light module has a top and a bottom, and the bottom is concave upward and provided with a first upper concave space. The second base of the second light module has a top and a bottom, and the top is provided with a protruding second connecting tube for detachably assembling the second support tube.

After the second simulated flame lighting module, the second support tube and the second base are disassembled from the second sleeve, the first light module can be stored in the second installation space, and then the second base is assembled with the bottom of the second sleeve, so that the second connecting tube is embedded into first upper concave space at the bottom of the first base to conceal the first light module between the second sleeve and the second base, and store the second simulated flame lighting module and the second support tube outside the second sleeve, thereby allowing the light modules of different sizes that originally needed to be packaged separately to be packaged together, thus reducing the transportation volume.

In one embodiment, the candle light further includes a third light module in a shape substantially the same as the first light module, wherein:

The third light module includes a third base provided with a battery, a third support tube, a third simulated flame lighting module assembled and electrically coupled to the battery, and a third sleeve. The third sleeve has an inner periphery, a top, and a bottom, the third sleeve has an inner periphery greater than the outer periphery of the second sleeve, and the third sleeve has a third installation space defined by its top, bottom and inner periphery for installing the third base, third support tube and the third simulated flame lighting module. The third base is detachably assembled with the bottom, the third simulated flame lighting module is detachably assembled with the top, and the third support tube is detachably assembled between the third simulated flame lighting module and the third base;

The bottom of the second base of the second light module is concave upward and provided with a second upper concave space; the third base of the third light module has a top and a bottom, the top is provided with a protruding third connecting tube detachably assembled with the third support tube.

After the third simulated flame lighting module, the third support tube and the third base are disassembled from the third sleeve, the second sleeve and the second base of the second light module can be stored in the third installation space, and then the third base is assembled with the bottom of the third sleeve, so that the third connecting tube is embedded in the second upper concave space at the bottom of the second base to conceal the second sleeve and the second base between the third sleeve and the third base, and the third simulated flame lighting module, the third support tube, the second simulated flame lighting module and the second support tube are stored outside the third sleeve.

Compared to the related art, the present invention integrates the base, the simulated flame lighting module and the sleeve of the candle light through a modular design, which allows at least two candle lights of different sizes to be integrated in a single package, not only providing consumers with a choice of sizes for use, but also reducing volume and packaging and transportation costs.

The technical characteristics of the present invention will become apparent with the detailed description of preferred embodiments accompanied with the illustration of related drawings.

DESCRIPTION OF THE PREFERRED EMBODIMENTS

With reference to FIGS. 1 to 4 for a candle light with a modular design that can facilitate the packaging and transportation in accordance with the present invention, the candle light includes a first light module 1, and a second light module 2 in a shape substantially the same as the first light module 1.

The first light module 1 includes a first base 10A, a first support tube 20A, a first simulated flame lighting module 30A, and a first sleeve 40A.

The first sleeve 40A is in a substantially cylindrical shape, and has a first installation space 44A defined between its top 41A, bottom 42A and inner periphery 43A for installing the first base 10A, the first support tube 20A and the first simulated flame lighting module 30A. The first base 10A is assembled with the bottom 42A, the first simulated flame lighting module 30A is assembled with the top 41A, and the first support tube 20A is assembled between the first simulated flame lighting module 30A and the first base 10A.

The first base 10A is provided with a battery 50A, the battery 50A is electrically connected to the first simulated flame lighting module 30A for supplying electric power for the operation of the first light module 1.

The second light module 2 includes a second base 10B, a second support tube 20B, a second simulated flame lighting module 30B, and a second sleeve 40B.

The second sleeve 40B is in a substantially cylindrical shape, and has a second installation space 44B defined between its top 41B, bottom 42B and inner periphery 43B.

The inner periphery 43B is greater than the outer periphery 45A of the first sleeve 40A, and the second installation space 44B is provided for installing the second base 10B, the second support tube 20B, and the second simulated flame lighting module 30B. The second base 10B is detachably assembled with the bottom 42B, the second simulated flame lighting module 30B is detachably assembled with the top 41B, and the second support tube 20B is detachably assembled between the second simulated flame lighting module 30B and the second base 10B.

The second base 10B is provided with a battery 50B, the battery 50B is electrically connected to the second simulated flame lighting module 30B for supplying electric power for the operation of the second light module 2.

The present invention is characterized in that the top 11A of the first base 10A is provided with a protruding first connecting tube 12A for assembling and positioning the first support tube 20A, and the bottom 13A of the first base 10A is concave upward and provided with a first upper concave space 14A.

The top 11B of the second base 10B is provided with a protruding second connecting tube 12B for detachably assembling and positioning the second support tube 20B.

Figure 5:
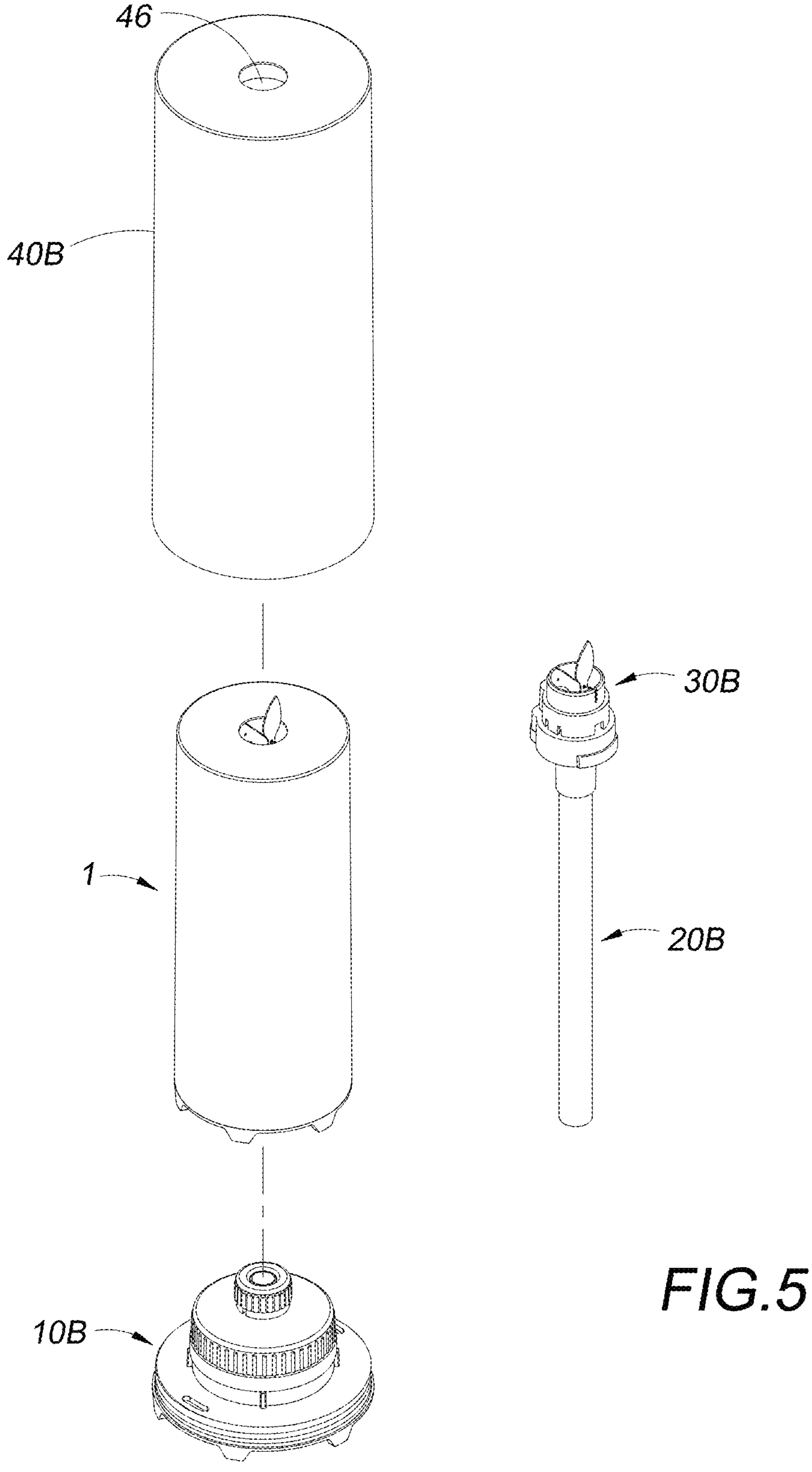
FIG. 5 is a schematic view showing the assembly of the first and second light modules during packaging in accordance with the present invention.
Figure 6:
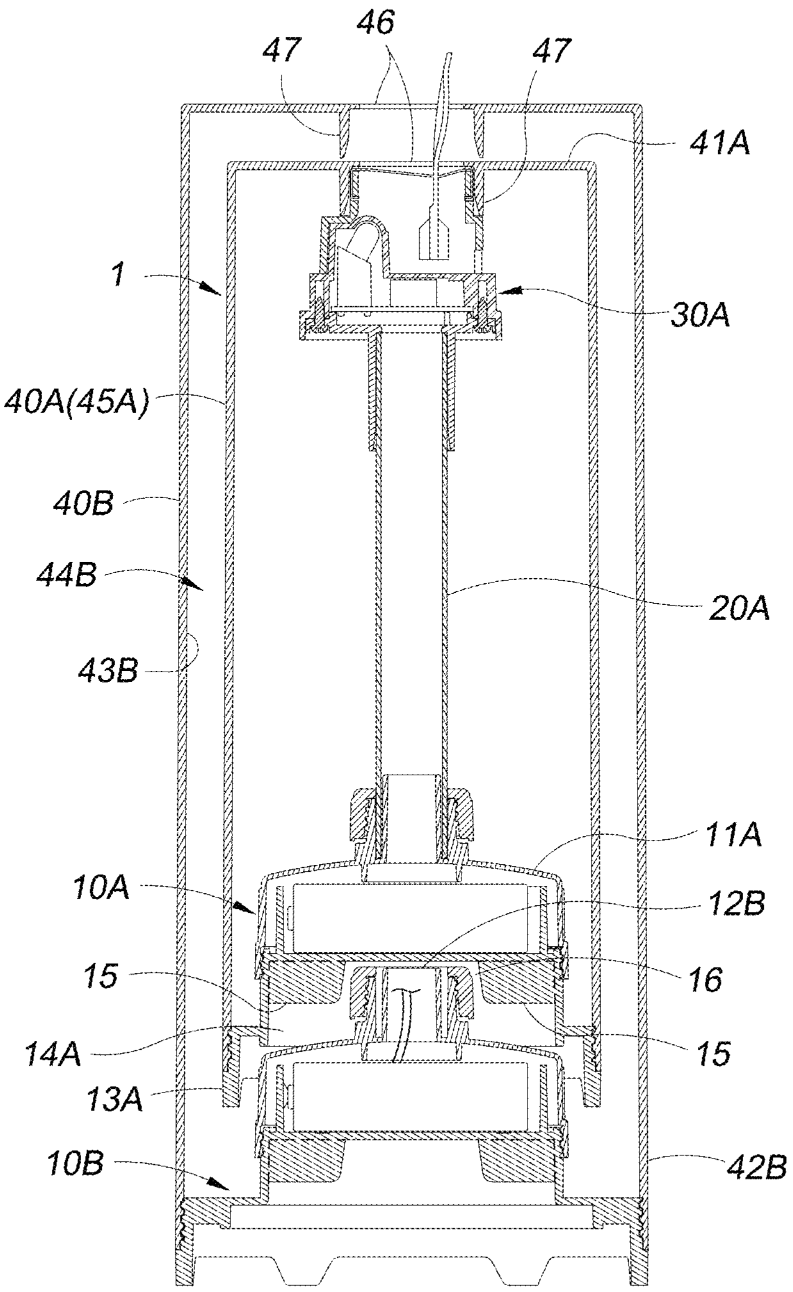
FIG. 6 is a cross-sectional side view of the first and second light modules during packaging in accordance with the present invention.

In FIGS. 5 and 6, since the inner periphery 43B of the second sleeve 40B is greater than the outer periphery 45A of the first sleeve 40A, after the second simulated flame lighting module 30B, the second support tube 20B and the second base 10B is disassembled from the second sleeve 40B, the whole first light module 1 can be stored in the second installation space 44B, and then the second base 10B is assembled with the bottom 42B of the second sleeve 40B, so that the second connecting tube 12B can be embedded in the first upper concave space 14A of the first base 10A.

After the second base 10B is assembled with the bottom 42B of the second sleeve 40B, the first light module 1 is concealed between the second sleeve 40B and the second base 10B, and the second simulated flame lighting module 30B and the second support tube 20B are stored outside the second sleeve 40B, so that the light modules of different sizes that originally needed to be packaged separately can be packaged together to reduce volume and transportation costs.

Figure 7:
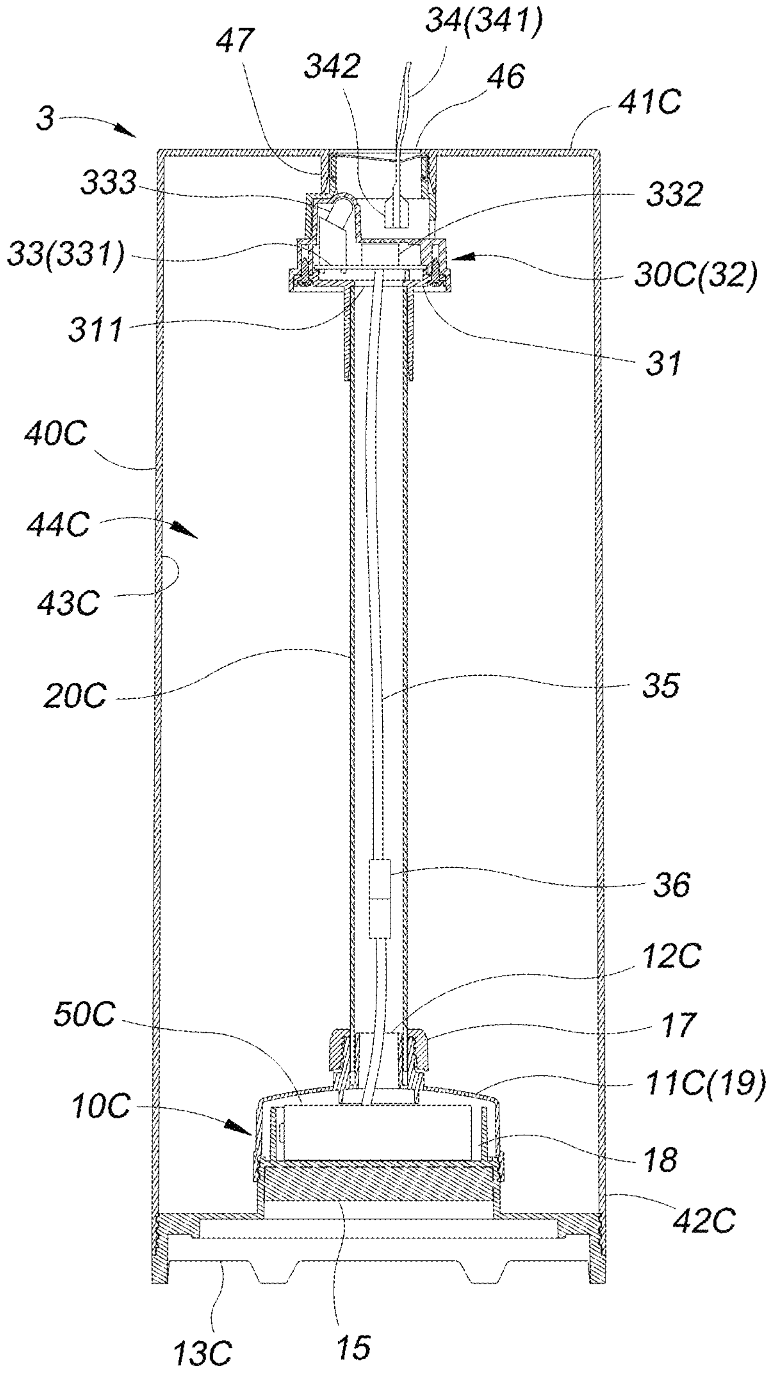
FIG. 7 is a cross-sectional side view of a third light module in accordance with the present invention.
Figure 8:
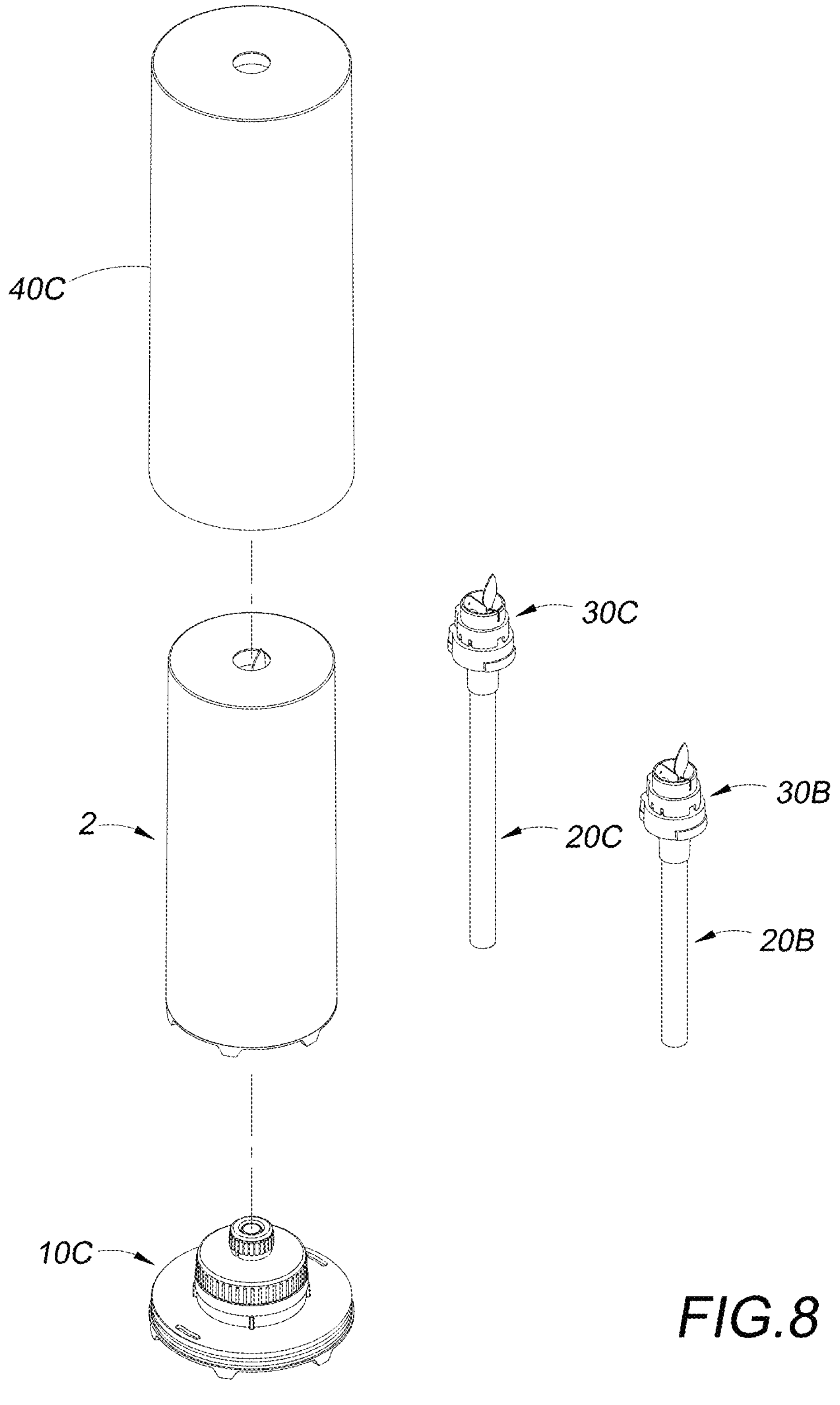
FIG. 8 is a schematic view of the assembly of the first, second and third light modules during packaging in accordance with the present invention.
Figure 9:
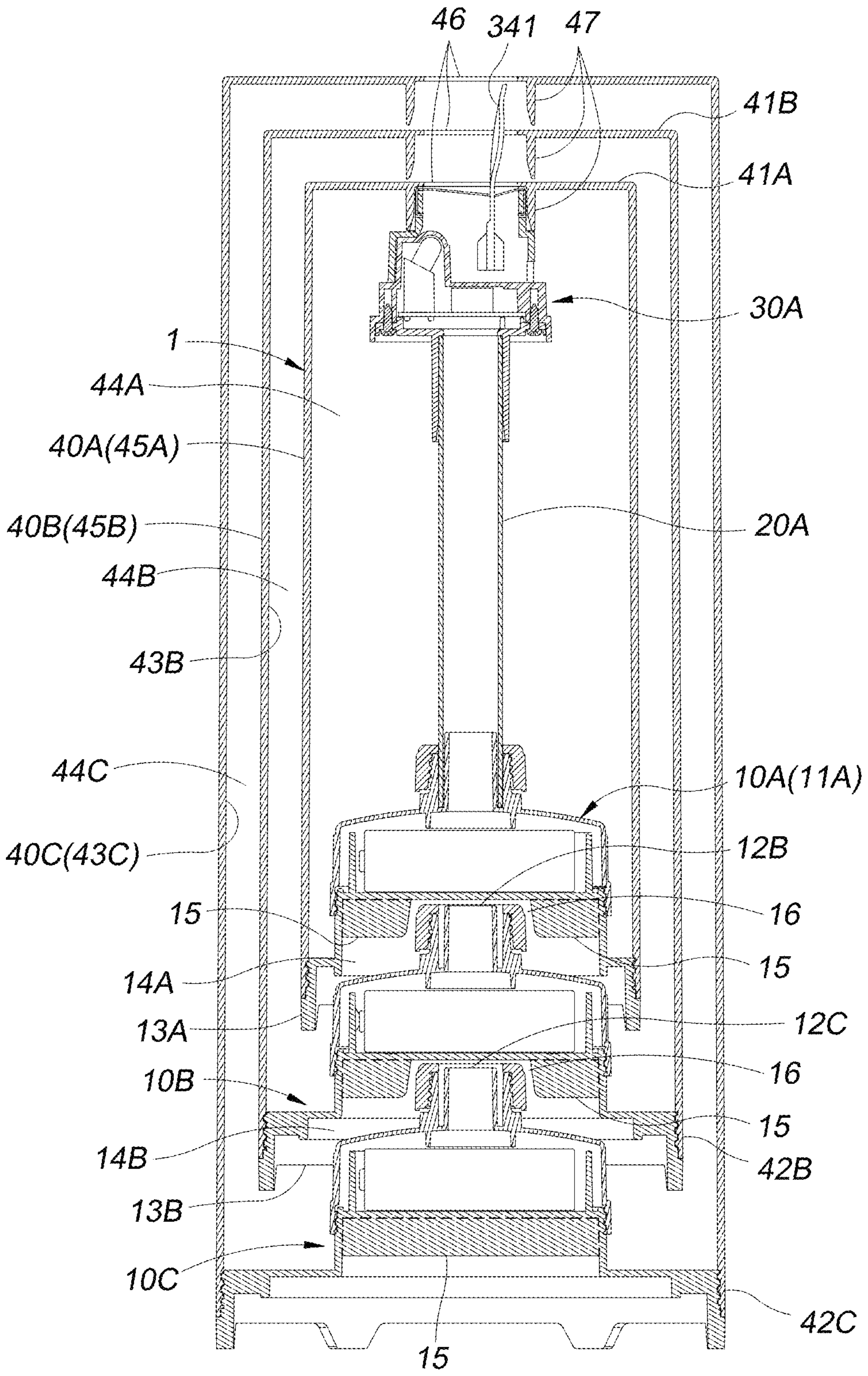
FIG. 9 is a cross-sectional side view of the first, second and third light modules during packaging in accordance with the present invention.

The modular design of the candle light is not limited to integrating and packaging two light modules together. In FIGS. 7 to 9, the candle light further includes a third light module 3 in a shape substantially the same as the first light module 1.

The third light module 3 includes a third base 10C, a third support tube 20C, a third simulated flame lighting module 30C, and a third sleeve 40C.

The third sleeve 40C is in a substantially cylindrical shape and has a third installation space 44C defined between its top 41C, bottom 42C and inner periphery 43C, and the inner periphery 43C is greater than the outer periphery 45B of the second sleeve 40B. The third installation space 44C is provided for installing the third base 10C, the third support tube 20C and the third simulated flame lighting module 30C. The third base 10C is detachably assembled with the bottom 42C, the third simulated flame lighting module 30C is detachably assembled with the top 41C, and the third support tube 20C is detachably assembled between the third simulated flame lighting module 30C and the third base 10C.

The third base 10C is provided with a battery 50C, the battery 50C is electrically connected to the third simulated flame lighting module 30C for supplying electric power for the operation of the third light module 3.

In the figures, the top 11C of the third base 10C is provided with a protruding third connecting tube 12C for detachably assembling the third support tube 20C; and the bottom 13B of the second base 10B is concave up with a second upper concave space 14B.

After the third simulated flame lighting module 30C, the third support tube 20C and the third base 10C are disassembled from the third sleeve 40C, the second sleeve 40B and the second base 10B of the second light module 2 can be stored in the third installation space 44C, and then the third base 10C is assembled with the bottom 42C of the third sleeve 40C, so that the third connecting tube 12C can be embedded in the second upper concave space 14B of the second base 10B.

Figure 10:
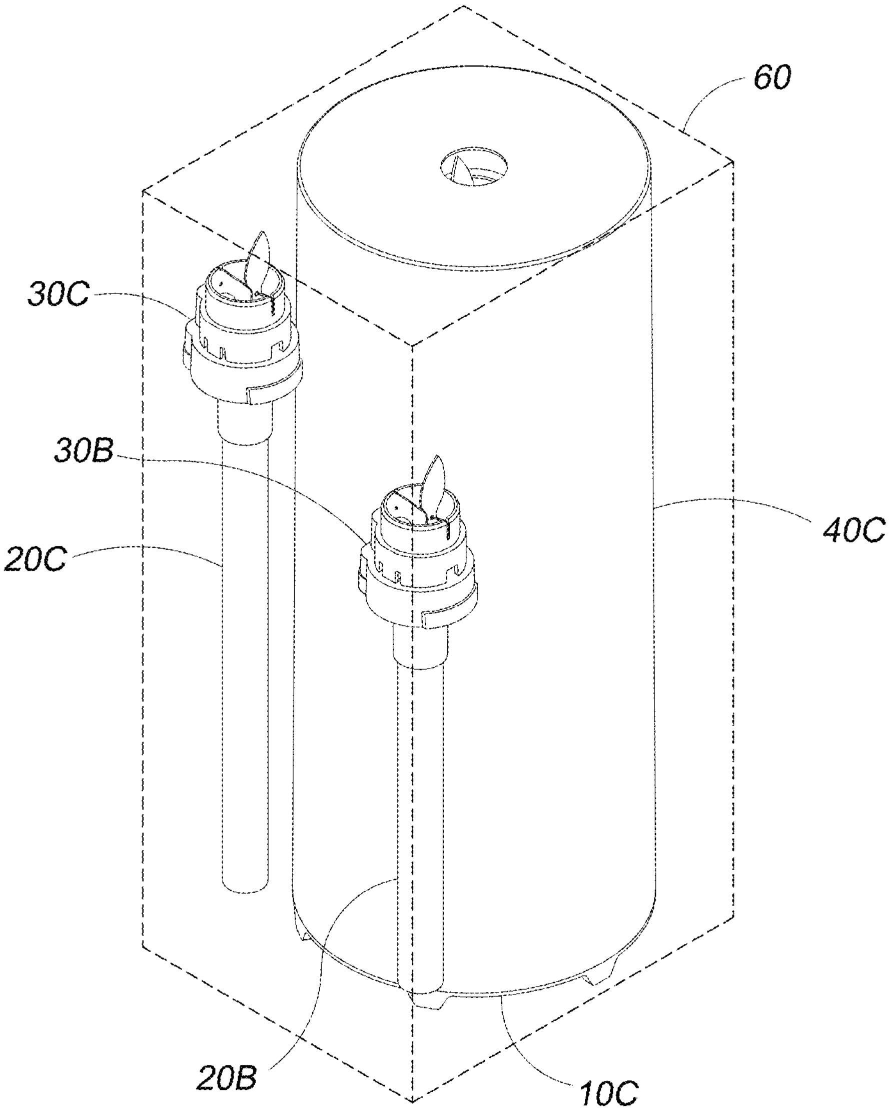
FIG. 10 is a perspective view of the first, second and third light modules during packaging in accordance with the present invention.

After the third base 10C is assembled with the bottom 42C of the third sleeve 40C, the second sleeve 40B and the second base 10B can be concealed between the third sleeve 40C and the third base 10C, and the third simulated flame lighting module 30C, the third support tube 20C, the second simulated flame lighting module 30B and the second support tube 20B are stored outside the third sleeve 40C. As shown in FIG. 10, a packaging box 60 is provided for packaging to allow candle lights of different sizes to be packaged together, thereby reducing the volume and transportation cost of separate packaging of each light module.

Through the above structure, the present invention integrates the base, the simulated flame lighting module and the sleeve of the candle light through modular design, so that at least two candle lights of different sizes can be packaged together, not only providing consumers with various sizes to choose from, but also reducing volume and packaging and transportation costs.

Figure 1:
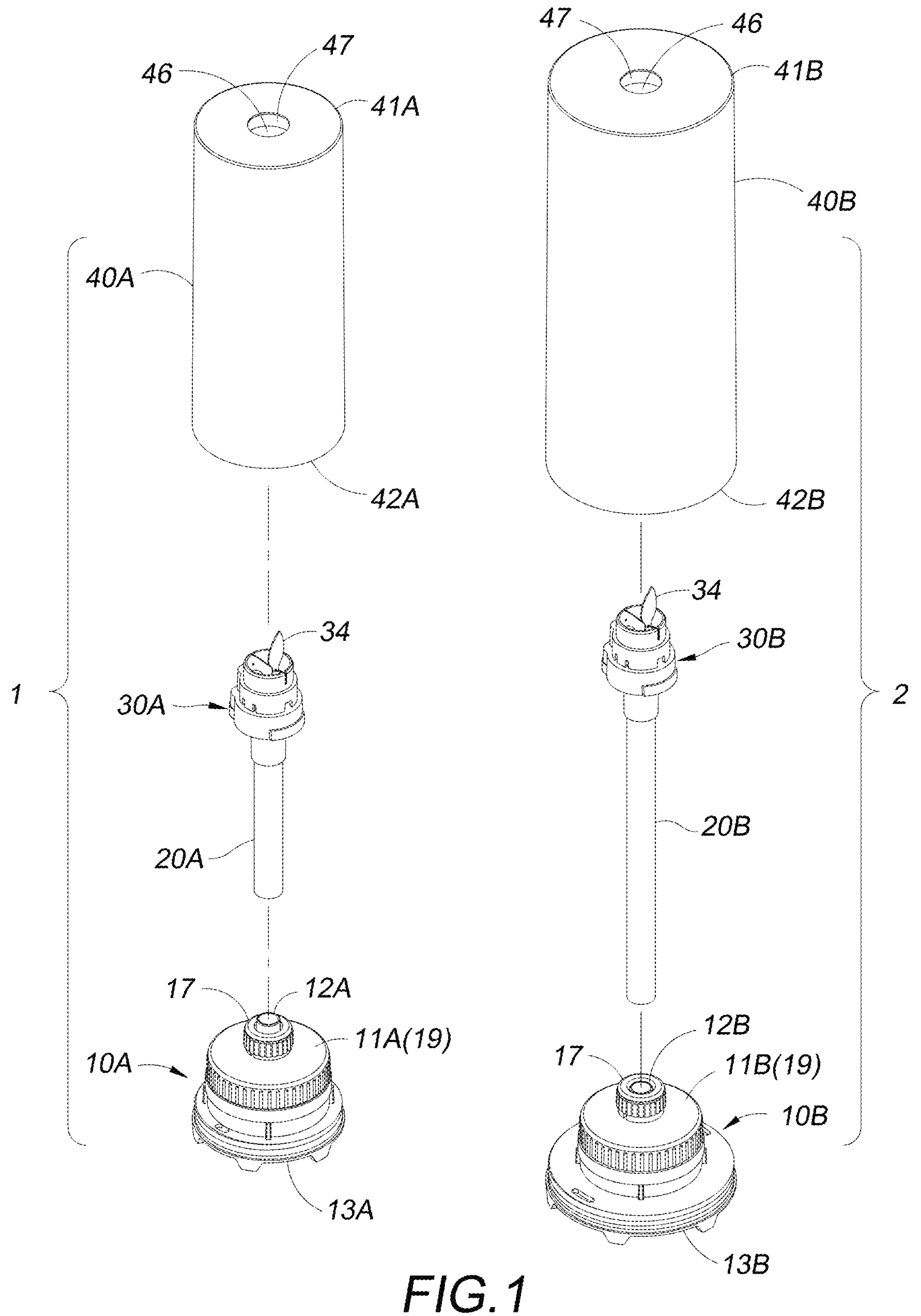
FIG. 1 is an exploded view of a first light module and a second light module of the present invention.
Figure 2:
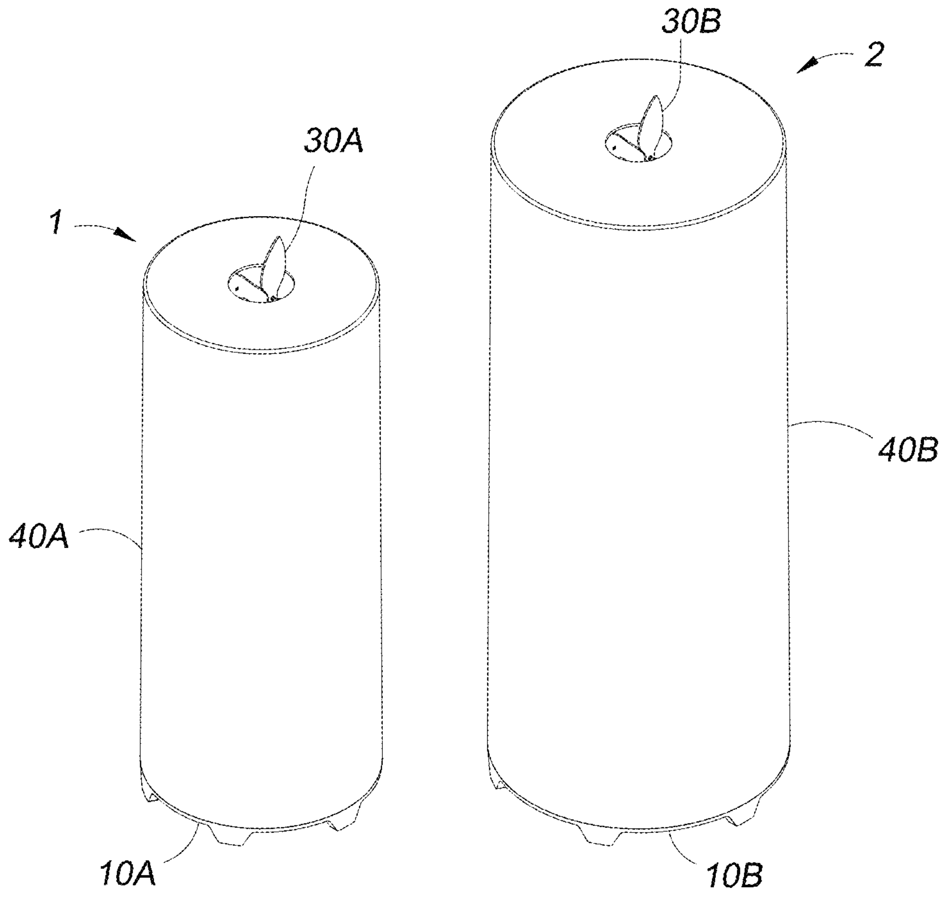
FIG. 2 is a perspective view of the first and second light modules of the present invention.
Figure 3:
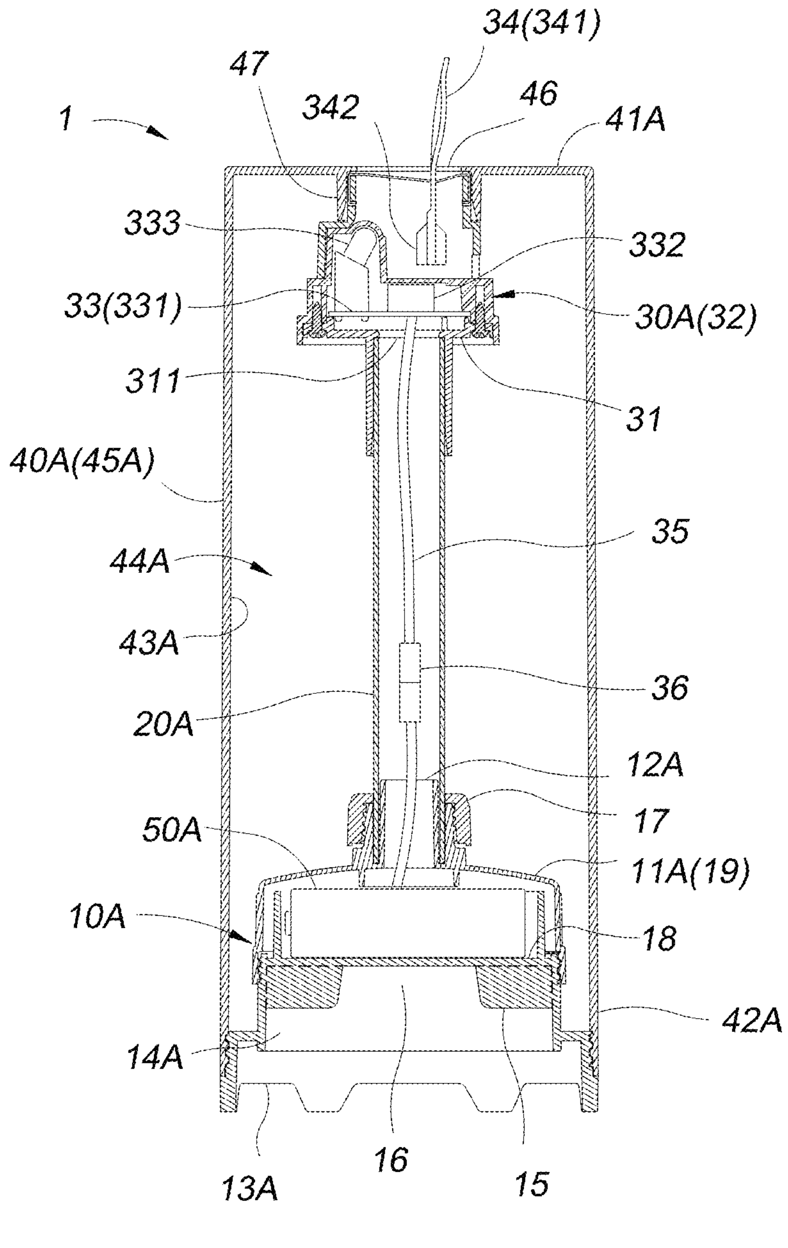
FIG. 3 is a cross-sectional side view of the first light module of the present invention.

The implementation of each light module is further described as follows:

With reference to FIG. 3 for the first light module 1 taken as an example, the top 41A of the first sleeve 40A is provided with a through hole 46 connected to the first installation space 44A, and the through hole 46 is used for positioning the first simulated flame lighting module 30A.

The first simulated flame lighting module 30A includes a base plate 31 assembled with the first support tube 20A, an outer frame component 32 assembled with the top of the base plate 31 and located under the through hole 46, and a printed circuit board assembly (PCBA) 33 fixed between the base plate 31 and the outer frame component 32, and a swinging part 34 swingably installed on the outer frame component 32. The base plate 31 is provided with a perforation 311 for electrically connecting a power cord 35 between the battery 50A and the printed circuit board assembly 33.

The swinging part 34 includes a simulated flame sheet 341 protruding from the corresponding through hole 46, and a pendulum 342 located under the simulated flame sheet 341.

The printed circuit board assembly 33 includes a substrate 331 fixed to the base plate 31, a drive element 332 arranged on the substrate 331, and an LED 333 projecting light towards the simulated flame sheet 341. The drive element 332 is located under the pendulum 342, and the drive element 332 can directly or indirectly drive the pendulum 342 of the swinging part 34 to swing and move. For example, driving means including as a motor and a transmission gear, or a motor and a transmission rod, or a magnetic drive can be used to produce the simulation of the flickering light of flames of the simulated flame sheet 341.

Figure 4:
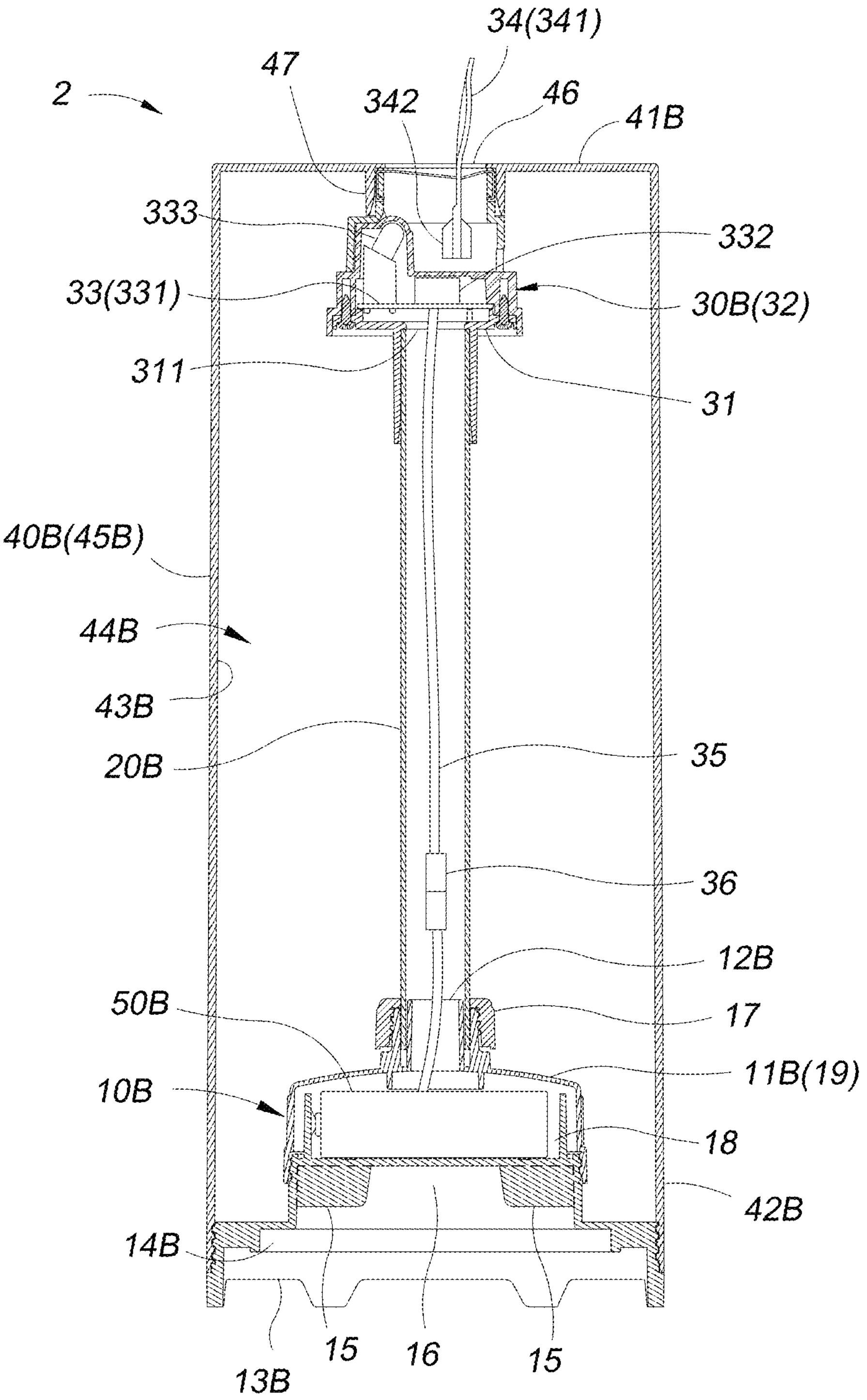
FIG. 4 is a cross-sectional side view of the second light module of the present invention.

Similarly, in FIGS. 3, 4 and 7, the second and third sleeves 40B, 40C and the second and third simulated flame lighting modules 30B, 30C have the same structure of the first sleeve 40A and the first simulated flame lighting module 30A. For example, the sleeve is provided with a through hole 46, and the simulated flame lighting module includes a base plate 31, an outer frame component 32, a printed circuit board assembly 33, a swinging part 34, a power cord 35, etc., and their structure and assembly will not be described here in detail.

In FIGS. 6 and 9, in order to facilitate the removal of each base from the corresponding sleeve, the first upper concave space 14A of the first base 10A and the second upper concave space 14B of the second base 10B are provided with two force applying plates 15 separated from each other respectively, so that users may apply force through the two force applying plates 15 to remove the first base 10A and the second base 10B from the corresponding sleeve.

A positioning spacing 16 is defined between every two force applying plates 15. When the first light module 1 is stored in the second installation space 44B, and the second base 10B is assembled with the bottom 42B of the second sleeve 40B, the second connecting tube 12B is embedded in the positioning spacing 16 at the bottom 13A of the first base 10A.

When the second sleeve 40B and the second base 10B are stored in the third installation space 44C, and the third base 10C is assembled with the bottom 42C of the third sleeve 40C, the third connecting tube 12C is embedded in positioning spacing 16 at the bottom 13B of the second base 10B. Similarly, the bottom 13C of the third base 10C is also provided with a force applying plate 15 to facilitate users to remove the third base 10C.

In FIG. 3, the center of the first base 10A is provided with a concave compartment 18 for installing a battery 50A, a cover 19 is clamped around the compartment 18 from top to bottom or screwed tightly with the compartment, and the first connecting tube 12A is arranged on the cover 19.

The first connecting tube 12A is provided with an outer thread, the outer thread is provided and screwed with a packing nut 17, such that after the first support tube 20A is assembled with the first connecting tube 12A, the first support tube 20A is packed and positioned through the packing nut 17.

The power cord 35 can extend from the first connecting tube 12A, and further extend inwardly upward in the first support tube 20A to electrically connect the printed circuit board assembly 33, and the power cord 35 is provided with an electrical connector 36 for quickly and electrically connect the printed circuit board assembly 33 and the battery 50A.

Similarly, in FIGS. 3, 4, and 7, the second, third base 10B, 10C has the same assembly and structure of the first base 10A. For example, the base includes a compartment 18, a cover 19, a packing nut 17, and a power cord 35, and the assembly of the electrical connector 36, etc. which will not be described in details here.

In FIGS. 3, 4, and 7, the through holes 46 of the first, second, and third sleeves 40A, 40B, and 40C are provided with a circular wall 47 extending toward the corresponding first, second, and third installation spaces 44A, 44B, and 44C, respectively.

In FIG. 9, when the first, second, and third sleeves 40A, 40B, 40C are stacked on each other, the circular wall 47 of the third sleeve 40C is stacked on the top 41B of the second sleeve 40B, the circular wall 47 of the second sleeve 40B is stacked on the top 41A of the first sleeve 40A, and three through holes 46 are aligned and communicated with the first installation space 44A; the total length of the three circular walls 47 is greater than or equal to the height of the simulated flame sheet 341 of the first simulated flame lighting module 30A to protect the simulated flame sheet 341 from being bent or damaged.

The above embodiments and drawings are only examples of preferred embodiments of the present invention, which are not intended to limit the scope of the present invention, numerous modifications and variations could be made thereto by those skilled in the art without departing from the scope and spirit of the invention as set forth in the claims, and any similarities with the purpose, structure, device, feature, etc. of the present invention shall fall within the patent scope of the present invention.

What is claimed is:

1. A candle light with a modular design for easy transportation, comprising a first light module, and a second light module in a shape substantially the same as the first light module wherein:

the first light module comprises a first base having a battery, a first support tube, a first simulated flame lighting module assembled and electrically coupled to the battery, a first sleeve having an inner periphery, an outer periphery, a top, and a bottom, and a first installation space is defined by the top, the bottom and the inner periphery of the first sleeve for installing the first base, the first support tube and the first simulated flame lighting module, and the first base is assembled with the bottom, the first simulated flame lighting module is assembled with the top, the first support tube is assembled between the first simulated flame lighting module and the first base;

the second light module comprises a second base provided with a battery, a second support tube, a second simulated flame lighting module assembled and electrically coupled to the battery, and a second sleeve having an inner periphery, an outer periphery, a top, and an open bottom, the inner periphery of the second sleeve is greater than the outer periphery of the first sleeve, and a second installation space is defined by the top, the bottom and the inner periphery of the second sleeve for installing the second base, the second support tube and the second simulated flame lighting module, such that the second base is detachably assembled with the bottom, the second simulated flame lighting module is detachably assembled with the top, and the second support tube is detachably assembled between the second simulated flame lighting module and the second base;

the first base of the first light module has a top and a bottom, the bottom is substantially concave upward and provided with a first upper concave space; the second base of the second light module has a top and a bottom, the top is provided with a protruding second connecting tube for detachably assembling the second support tube;

after the second simulated flame lighting module, the second support tube and the second base are disassembled from the second sleeve, the first light module can be stored in the second installation space, and then the second base is assembled with the bottom of the second sleeve, so that the second connecting tube is embedded into the first upper concave space at the bottom of the first base to conceal the first light module between the second sleeve and the second base, and the second simulated flame lighting module and the second support tube are stored outside the second sleeve, so as to allow the light modules of different sizes that originally need to be packaged separately to be packaged together and to reduce transportation volume.

2. The candle light with a modular design for easy transportation according to claim 1, further comprising a third light module in a shape substantially the same as the first light module, wherein:

the third light module comprises a third base provided with a battery, a third support tube, a third simulated flame lighting module assembled and electrically coupled to the battery, and a third sleeve having an inner periphery, a top, and a bottom, the inner periphery of the third sleeve is greater than the outer periphery of the second sleeve, and the third sleeve has a third installation space defined between its top, bottom and inner periphery for installing the third base, the third support tube and the third simulated flame lighting module, the third base is detachably assembled with the bottom, the third simulated flame lighting module is detachably assembled with the top, and the third support tube is detachably assembled between the third simulated flame lighting module and the third base;

the bottom of the second base of the second light module is concave upward and provided with a second upper concave space, the third base of the third light module has a top and a bottom, and the top is provided with a protruding third connecting tube for detachably assembling the third support tube; and after the third simulated flame lighting module, the third support tube and the third base are disassembled from the third sleeve, the second sleeve and the second base of the second light module can be stored in the third installation space, and then the third base can be assembled with the bottom of the third sleeve, so the third connecting tube is embedded in the second upper concave space at the bottom of the second base to conceal the second sleeve and the second base between the third sleeve and the third base, and the third simulated flame lighting module, the third support tube, the second simulated flame lighting module and the second support tube are stored outside the third sleeve.

3. The candle light with a modular design for easy transportation according to claim 2, wherein the first upper concave space of the first base and the second upper concave space of the second base are provided with two force applying plates which are spaced apart from each other, and a positioning spacing is defined between every two force applying plates;

When the first light module is stored in the second installation space, and the second base is assembled with the bottom of the second sleeve, the second connecting tube is embedded in the positioning spacing at the bottom of the first base; and When the second sleeve and the second base are stored outside the third installation space, and the third base is assembled with the bottom of the third sleeve, the third connecting tube is embedded in the positioning spacing at the bottom of the second base.

4. The candle light with a modular design for easy transportation according to claim 2, wherein the first, second, and third sleeves have a through hole respectively formed their top and communicated with the corresponding first, second, third installation space, and each through hole is provided for positioning each corresponding first, second, and third simulated flame lighting modules.

5. The candle light with a modular design for easy transportation according to claim 4, wherein the first, second, and third simulated flame lighting modules respectively comprise a base plate assembled with the corresponding first, second, and third support tubes, an outer frame component assembled with the top of the base plate and located under the corresponding through hole, a printed circuit board assembly (PCBA) fixed between the base plate and the outer frame component, a swinging part swingably installed on the outer frame component, and the base plate is provided with a perforation for electrically coupling a power cord between the corresponding battery and printed circuit board assembly, wherein:

the swinging part comprises a simulated flame sheet protruding from the corresponding through hole, and a pendulum located under the simulated flame sheet;

the printed circuit board assembly comprises a substrate fixed onto the base plate, a drive element arranged on the substrate, and an LED projecting light towards the simulated flame sheet, the drive element is located under the pendulum of the swinging part, and the drive element can directly or indirectly drive the pendulum of the swinging part to swing and move, so as to make the simulated flame sheet to produce a simulation of the flickering light of flames.

6. The candle light with a modular design for easy transportation according to claim 5, wherein the top of the first base of the first light module is provided with a protruding first connecting tube for assembling the first support tube.

7. The candle light with a modular design for easy transportation according to claim 6, wherein the first, second and third connecting tubes are respectively provided with an outer thread, and the outer threads of the first, second, and third connecting tube are provided and screwed with a packing nut for packing and positioning the first, second and third support tubes.

8. The candle light with a modular design for easy transportation according to claim 7, wherein the center of the first, second and third bases respectively have a concave compartment for installing the corresponding battery, a cover is clamped around the compartment 18 from top to bottom or screwed tightly with the compartment, and the first, second and third connecting tube are arranged on the cover, and the first, second and third connecting tubes and the first, second and third support tubes are provided for passing through the corresponding power cord and electrically coupling the corresponding power cord between the corresponding printed circuit board assembly and battery.

9. The candle light with a modular design for easy transportation according to claim 8, wherein each power cord is provided with an electrical connector for quickly and electrically coupling the corresponding printed circuit board assembly and battery.

10. The candle light with a modular design for easy transportation according to claim 5, wherein the through holes of the first, second and third sleeves are respectively provided with a first circular wall, a second circular wall, and a third circular wall extending towards the corresponding first, second and third installation spaces;

When the first, second and third sleeves are stacked on one another, the third circular wall is stacked on the top of the second sleeve, the second circular wall is stacked on the top of the first sleeve, and the three through holes are aligned and communicatee to the first installation space; the total height of the first, second and third circular walls is greater than or equal to the height of the simulated flame sheet of the first simulated flame lighting module.

* * * * *